Sept. 25, 1956
T. B. WEBB
2,763,923
METHOD OF AND TRANSITION MEMBER FOR
WELD UNITING DISSIMILAR METALS
Filed June 27, 1951
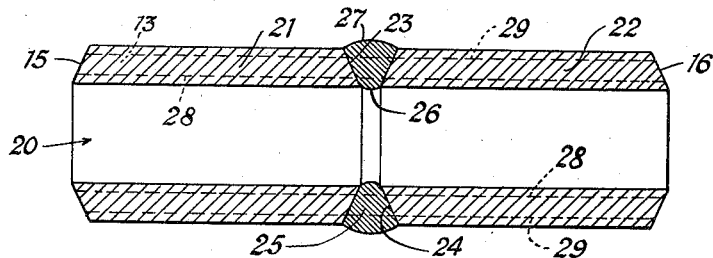
FIG. 1
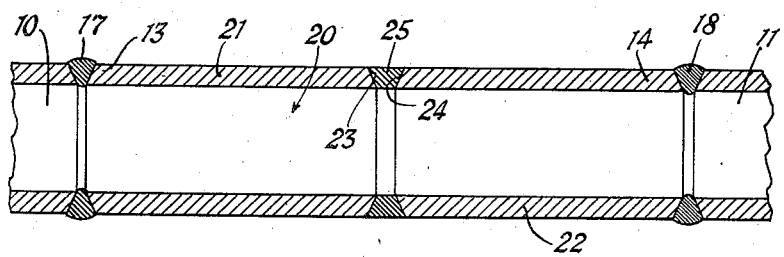
FIG. 2
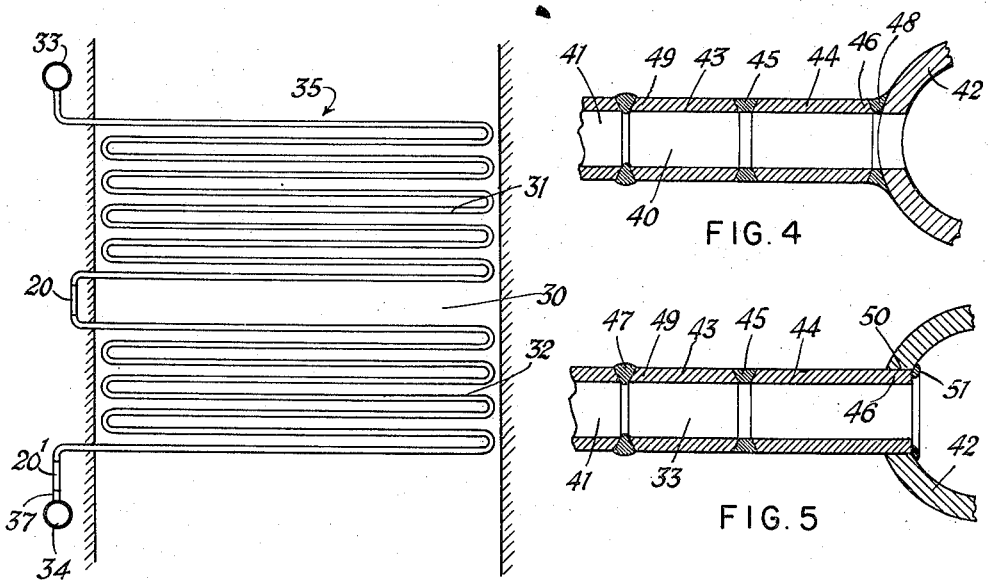
FIG. 3
FIG. 4
FIG. 5
INVENTOR
Thomas B. Webb
BY
J P Moran
ATTORNEY United States Patent Office 2,763,923
Patented Sept. 25, 1956

2,763,923

METHOD OF AND TRANSITION MEMBER FOR WELD UNITING DISSIMILAR METALS

Thomas Basil Webb, Beckenham, England, assignor to The Babcock & Wilcox Company, Rockleigh, N. J., a corporation of New Jersey Application June 27, 1951, Serial No. 233,755

2 Claims. (Cl. 29—472.1)

This invention relates to a method of and a transition member for joining austenitic and ferritic materials suitable for high temperature, high pressure service under conditions involving thermal shock and cyclic temperature and load applications.

Such conditions are encountered in high temperature process plants such as, for example, oil refineries, in vapor or steam generators, and in heat exchangers of various types. The particular problems in any one type of installation may differ in one or more aspects from those in another type. While the invention is of general application under high temperature, high stress conditions in any type of installation, particular reference will be made, by way of example only, to the high temperature and high stress conditions encountered in steam generating units.

In order to obtain higher efficiencies, the outlet steam temperatures and the operating pressures of central station steam generating plants have been constantly increasing, and presently some central station steam generating units have outlet temperatures of 1050° F. and operating pressures up to and over 2000 p. s. i. The increasing use of such high temperatures and pressures has brought with it problems of providing materials and joints between such materials which will successfully withstand the stresses encountered thereat.

The long time load-carrying characteristics of metals at high temperatures, together with the economics involved, have led steam generator designers to use both austenitic and ferritic materials for the components of or associated with steam generators. Use of both types of materials in the same component requires that particular attention be given to the junctions between these materials, which junctions must operate under the particular temperature and stress conditions encountered in producing steam at relatively high temperatures.

Operation under stress at such high temperatures introduces many problems due to the differential expansion and contraction of the dissimilar materials on either side of the joint, their relative surface and structural stability, etc. Aside from mechanical stresses, such as, for example, those due to differential thermal expansion and contraction, the factors influencing the service life of welded joints between ferritic and austenitic materials have been basically of a metallurgical nature, such as carbon depletion in the heat affected zone of the ferritic material, notching due to oxide penetration occurring therein, micro-fissuring in the weld junction, and accelerated creep due to these conditions.

An austenitic steel, such as a steel containing 18% chromium and 8 to 12% nickel may advantageously be used in a high temperature superheater on account of its relatively high strength at elevated temperatures and its resistance to oxidation when compared with a ferritic steel, such as a steel containing ½% molybdenum or 1% chromium. At one end of a tube of austenitic steel, however, at a joint between the tube and a tube or header of ferritic steel, difficulties may arise owing to the different coefficients of thermal expansion of the two steels.

Thus, with the relatively high temperatures obtaining immediately after a welded joint is made, the joint may be substantially unstressed, but as the joint cools to room temperature considerable stresses arise. While the superheater is at operating temperature the stress is relatively low, but each time the steam generator is shut down the stress increases, perhaps almost to the yield point of metal of the joint. As a result, frequent cooling down of the superheater upon withdrawal of the steam generator from operation is liable to produce fatigue cracking at the joint.

In accordance with the present invention, an austenitic element is weld united to a ferritic element by welding each element to a relatively short transition member or piece. This transition member comprises a short austenitic section welded to a short ferritic section, the member being machined on each surface to remove material from the root and from the surface of the welded joint. Prior to such machining, the transition member may be suitably heat treated or normalized to stress relieve the joint and the weld united sections. In connecting the main elements, the austenitic section of the transition piece is welded to the austenitic element and the ferritic section is welded to the ferritic element. The two sections of the transition member have compositions closely approximating these of the dissimilar metal elements to be joined.

As applied to the joining of liquid or gas confining or conducting apparatus, the invention involves the joining of an austenitic tube, pipe, header, or drum to a ferritic tube, pipe, header, or drum by a short tubular transition piece comprising an austenitic tube or pipe section welded to a ferritic tube or pipe section. The tubular transition piece has its inner and outer surfaces machined, after heat treatments such as normalizing, to remove the root and surface of the welded joint. The austenitic transition piece section is welded or united to the austenitic element and the ferritic transition piece section is welded or united to the ferritic element.

The transition piece may be welded to two tubes, one austenitic, the other ferritic. Alternatively, the transition piece may be used to connect an austenitic superheater section to a ferritic superheater section. As another example, the austenitic transition piece section may be welded to an austenitic tube and the ferritic section be welded to or expanded into a ferritic header or drum with or without seal welding.

For an understanding of the invention principles, reference is made to the following description of typical embodiments thereof as illustrated in the accompanying drawing.

In the drawing:

Fig. 1 is a longitudinal sectional view of a transition piece after weld uniting of its component pipe but before it is machined preparatory to incorporation in a tube or pipe joint;

Fig. 2 is a longitudinal sectional view of a joint, according to the invention, between an austenitic and a ferritic steel tube or pipe;

Fig. 3 schematically represents a steam superheater having a section using tubes of austenitic steel and a section using tubes of ferritic steel, and arranged in a passage such as may conduct hot gases from the furnace of a steam generator;

Fig. 4 is a longitudinal sectional view of a joint between an austenitic steel tube or pipe and a ferritic steel header; and Fig. 5 is a longitudinal sectional view of a modification of the joint shown in Fig. 4.

Referring to Figs. 1 and 2, the invention is shown as applied to join an austenitic steel tube or pipe 10 to a ferritic steel tube or pipe 11, tubes 10 and 11 each being butt welded to a tubular transition piece 20.

Transition piece or member 20 is formed of two short lengths of tube or pipe 21, 22 having respective chamfered ends 23, 24 forming a welding groove when abutted. The tube lengths are united by a butt weld 25 between chamfered or bevelled ends 23, 24, weld 25 being formed by weld depositing weld metal of a suitable composition into the welding groove formed by the abutted bevelled ends.

After the tube pipe lengths have been welded together, and after any desirable heat treatment such as normalizing, the united tube or pipe lengths are machined internally and externally throughout their united lengths to the extent indicated by the dotted lines 28 and 29, respectively. The pipe lengths are originally of smaller internal and larger external diameter than the tubes or pipes 10 and 11 and internal and external machining to bring the transition piece to the same internal and external diameters as the tubes or pipes 10 and 11 removes substantial material at the root 26 of the butt weld and at the butt weld surface 27.

The ends 13 and 14 of the transition piece, respectively of austenitic and ferritic steels, are chamfered as shown at 15 and 16, respectively, so that butt welding grooves may be formed with the ends of the tubes or pipes 1 and 2 respectively and the transition piece is welded to the tube or pipe 1 by a butt weld 17 and to the tube or pipe 2 by a butt weld 18.

The butt weld 17 may be made of excellent character by choice of the austenitic steel of the pipe or tube length 2 to have the same, or closely approximate, composition and hence coefficient of expansion as that of the tube or pipe 10 and by use of an appropriate weld metal, and similarly the butt weld 18 may be made of excellent character by choice of the ferritic steel of the pipe or tube length 22 to have the same or closely approximate composition and hence coefficient of expansion as that of the tube or pipe 11 and by use of an appropriate weld metal.

The butt weld 25 may be subjected to a suitable form of non-destructive testing, before the transition piece is welded to the tubes. Radiographic testing is facilitated because the transition piece is short enough for the interior surface of the butt weld to be readily accessible, while ultrasonic testing can be carried out using the end surfaces, before chamfering, of the transition piece. The removal during the machining of the transition piece of material at the root of the butt weld excises a region which is prone to fatigue cracking after repeated heating of the joint to and its cooling from a high temperature. The machining of the outside of the transition piece removes discontinuities in the surface liable to constitute another weakness.

Fig. 3 shows the invention applied to a superheater 35 contained in a passage 30 arranged for the flow of furnace gases therein first over a superheater section 32 and then over a superheater section 31, the sections being connected in series between steam inlet and outlet headers 33 and 34 disposed outside the gas passage. Each superheater section consists of a plurality of looped tubes having tube lengths extending across the gas passage and each tube of the superheater section 31 is connected with a respective tube of the superheater section 32.

The gas temperatures outside the tubes of the superheater section 32 are higher than the gas temperatures outside the tubes of the superheater section 31 and the steam flow is in counterflow to the gas flow. As a consequence, the tubes of the superheater section 32 are subject to more onerous conditions than the tubes of the superheater section 31 and are of an austenitic steel of high tensile strength and high resistance to oxidation at high temperatures. The tubes of the superheater section 31, however, are of a ferritic steel. The joint between each austenitic tube of the superheater section 32 and the corresponding ferritic tubes of the superheater section 31 comprises a transition piece 20 as shown in Fig. 1, which is connected to the respective tubes at a relatively accessible location outside the gas passage. In assembling the superheater each transition piece may be welded to both tubes on site or to one tube only the connection to the other tube having been made in the factory. The transition piece is not subject to contact with the hot gases and may easily be replaced if necessary.

Another transition piece 20' is provided to join the other end of each tube of the superheater section 32, at a location such as 26 also outside the gas passage and accessible, to an end of a respective ferritic stub tube 37 whose other end is rolled into the outlet header 34. Replacement of a tube of the superheater section 32 is a matter of replacing the length between the transition pieces 20 and 20'.

Fig. 4 shows the connection of a tube or pipe 41 of austenitic steel to a header 42 of ferritic steel in which a joint is formed between the tube or pipe 41 and the header 42 with a transition piece 40 of which the ferritic part is connected directly to the header. The transition piece is formed of a short length of pipe 43 of austenitic steel and a length of pipe 44 of ferritic steel which have been welded together at 45 and machined internally and externally as described, with references to the transition piece 20 of Fig. 1, and the end 46, remote from the weld 45, of the ferritic pipe length is welded at 48 to the header 32. Such welding, together with a subsequent heat treatment, will normally take place in the factory. The end 49, remote from the weld 45, of the austenitic pipe length is welded by a butt weld 47 to the tube or pipe 41.

Fig. 5 shows a modification of the arrangement of Fig. 4, the same reference numerals denoting the same items as in Fig. 4, in which the ferritic pipe length 44 of the transition piece is expanded at its end 46 in a tube or pipe seat 50 in the header 42, the outer rim of the tube or pipe end being seal welded at 51 to the header.

While specific embodiments of the invention have been shown and described in detail to illustrate the application of the invention principles, it should be understood that the invention may be otherwise embodied without departing from such principles.

I claim:

1. In the fabrication of a tubular structure, such as a heat exchanger, for operation at elevated temperatures and pressures under conditions involving thermal shock and cyclic variations in temperature and load and including joints between austenitic steel tubular components and ferritic steel tubular components, the design and dimensions of such structure being such that heat treating and machining of the assembled components is impractical or impossible, the method of joining an austenitic steel tubular component of such structure to a ferritic steel tubular component of such structure which comprises forming a tubular transition member, having an internal diameter less than that of said components, by butt welding a tubular austenitic steel piece to a tubular ferritic steel piece; normalizing the transition member; removing metal from the inner surface of said member to remove metal from the root of the weld and increase the internal diameter to that of said components; fusion welding the austenitic steel tubular component to the austenitic steel piece of the transition member; and fusion welding the ferritic steel tubular component to the ferritic steel piece of the transition member.

2. In the fabrication of a tubular structure, such as a heat exchanger, for operation at elevated temperatures and pressures under conditions involving thermal shock and cyclic variations in temperature and load and including joints between autenitic steel tubular components and ferritic steel tubular components, the design and dimensions of such structure being such that heat treating and machining of the assembled components is impractical or impossible, the method of joining an austenitic steel tubular component of such structure to a ferritic steel tubular component of such structure which comprises forming a tubular transition member, having an internal diameter less than that of said components and an external diameter greater than that of said components, by butt welding a tubular austenitic steel piece to a tubular ferritis steel piece; normalizing the transition member; removing metal from the inner and outer surfaces of said member to remove metal from the root and surface of the weld and increase the internal diameter to that of said components and reduce the external diameter to that of said component; fusion welding the austenitic steel tubular component to the austenitic steel piece of the transition member; and fusion welding the ferritic steel tubular component to the ferritic steel piece of the transition member.

References Cited in the file of this patent

UNITED STATES PATENTS

| | | |
|---|---|---|
| 1,613,461 | Johnson | Jan. 4, 1927 |
| 1,647,570 | Kling | Nov. 1, 1927 |
| 1,908,020 | Hulsart | May 9, 1933 |
| 1,937,239 | McWane | Nov. 28, 1933 |
| 2,014,795 | Birdsey | Sept. 17, 1935 |
| 2,200,156 | Cassidy | May 7, 1940 |
| 2,200,229 | Strauss | May 7, 1940 |
| 2,223,648 | Wachowitz | Dec. 3, 1940 |
| 2,229,405 | Currier | Jan. 21, 1941 |
| 2,240,203 | Armacost | Apr. 29, 1941 |
| 2,249,723 | Orr | July 15, 1941 |
| 2,258,913 | Stone | Oct. 14, 1941 |
| 2,268,343 | Phillips | Dec. 30, 1941 |
| 2,306,421 | Arness | Dec. 29, 1942 |
| 2,396,704 | Kerr | Mar. 19, 1946 |

FOREIGN PATENTS

| | | |
|---|---|---|
| 367,026 | Great Britain | Feb. 15, 1932 |

OTHER REFERENCES

Welding Handbook, Third Edition, pages 656, 670 and 671. Published by American Welding Society, 33 West 39th St., New York 18, N. Y.